(12) United States Patent
Chang

(10) Patent No.: US 9,985,684 B2
(45) Date of Patent: May 29, 2018

(54) PASSIVE EQUALIZER CAPABLE OF USE IN HIGH-SPEED DATA COMMUNICATION

(71) Applicant: FREESCALE SEMICONDUCTOR, INC., Austin, TX (US)

(72) Inventor: Kevin Yi Cheng Chang, Austin, TX (US)

(73) Assignee: NXP USA, INC., Austin, TX (US)

( * ) Notice: Subject to any disclaimer, the term of this patent is extended or adjusted under 35 U.S.C. 154(b) by 184 days.

(21) Appl. No.: 15/053,036

(22) Filed: Feb. 25, 2016

(65) Prior Publication Data
US 2017/0250730 A1  Aug. 31, 2017

(51) Int. Cl.
*H04B 3/14* (2006.01)
*H04B 3/04* (2006.01)

(52) U.S. Cl.
CPC .............. *H04B 3/14* (2013.01); *H04B 3/04* (2013.01); *H04B 3/145* (2013.01)

(58) Field of Classification Search
CPC . H04B 3/04; H04B 3/14; H04B 3/144; H04B 3/145; H04B 3/143
USPC .................. 333/28 R; 375/229, 230
See application file for complete search history.

(56) References Cited

U.S. PATENT DOCUMENTS

| 5,274,339 | A | * | 12/1993 | Wideman | ................ H03F 3/607 330/277 |
|---|---|---|---|---|---|
| 7,656,939 | B2 | | 2/2010 | Gondi et al. | |
| 7,671,694 | B2 | | 3/2010 | Yeung et al. | |
| 8,115,566 | B2 | | 2/2012 | Chou et al. | |
| 2015/0171920 | A1 | * | 6/2015 | Kameya | .................... H04B 3/14 333/28 R |

OTHER PUBLICATIONS

Parikh, S., "A 32Gb/s Wireline Receiver with a Low-Frequency Equalizer, CTLE and 2-Tap DFE in 28nm CMOS", 2013 IEEE International Solid-State Circuits Conference, Session 2, Ultra-High-Speed Transceivers and Equalizers, 2.1.

* cited by examiner

*Primary Examiner* — Stephen E Jones

(57) ABSTRACT

A passive equalizer is provided. The passive equalizer includes a first resistive element, a first inductive element, a second resistive element, and a first variable capacitor. The first resistive element is coupled between an input node and an output node. The first inductive element and the second resistive element are coupled in series between the output node and a first voltage supply node. The first variable capacitor is coupled between the input node and a first node located between the first inductive element and the second resistive element.

20 Claims, 3 Drawing Sheets ically, to a passive equalizer capable of use in high-
speed data communication.

PASSIVE EQUALIZER CAPABLE OF USE IN HIGH-SPEED DATA COMMUNICATION

BACKGROUND

Field

This disclosure relates generally to equalizers, and more specifically, to a passive equalizer capable of use in high-speed data communication.

Related Art

High-speed serial data communication is used in many different applications. A high-speed serial data communication system typically includes a transmitter for generating an electrical signal which represents serial data, a channel for transmitting the electrical signal, and a receiver for receiving the transmitted electrical signal and detecting the serial data represented by the electrical signal. In one example, the channel is typically a trace on a printed circuit board (PCB). Alternatively, it may be a different type of transmission line. Generally, the channel operates like a low-pass filter in which the high frequency portion of the signal is attenuated. This results in distortion the transmitted electrical signal. An equalizer may therefore be used to equalize the overall gain in the overall transmission path for different frequency components in the electrical signals. The equalizer attempts to operate opposite to the channel by boosting the gain at the higher frequencies. While passive equalizers consume less power than active equalizers, passive equalizers available today are limited.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a high-speed serial communication system, equalizers (EQs) may be used in receivers to counter the distortion introduced to electrical signals as they travel from a transmitter through a channel to a receiver. A passive EQ network is disclosed for generating a gain magnitude greater than one at a high-frequency range and for enhancing the overall bandwidth for passive plus active equalizer stages. The passive EQ circuit uses a three-element resonant circuit with a serial LC and a shunt C to form a unilateral voltage transfer-function equalization gain greater than one and a resistive voltage-divider for a DC gain. A positive feedback scheme is formed when a second passive equalizer is combined back-to-back. The positive feedback scheme is useful with the active equalizers for both high-frequency and low-frequency gain equalization.

Figure 1:
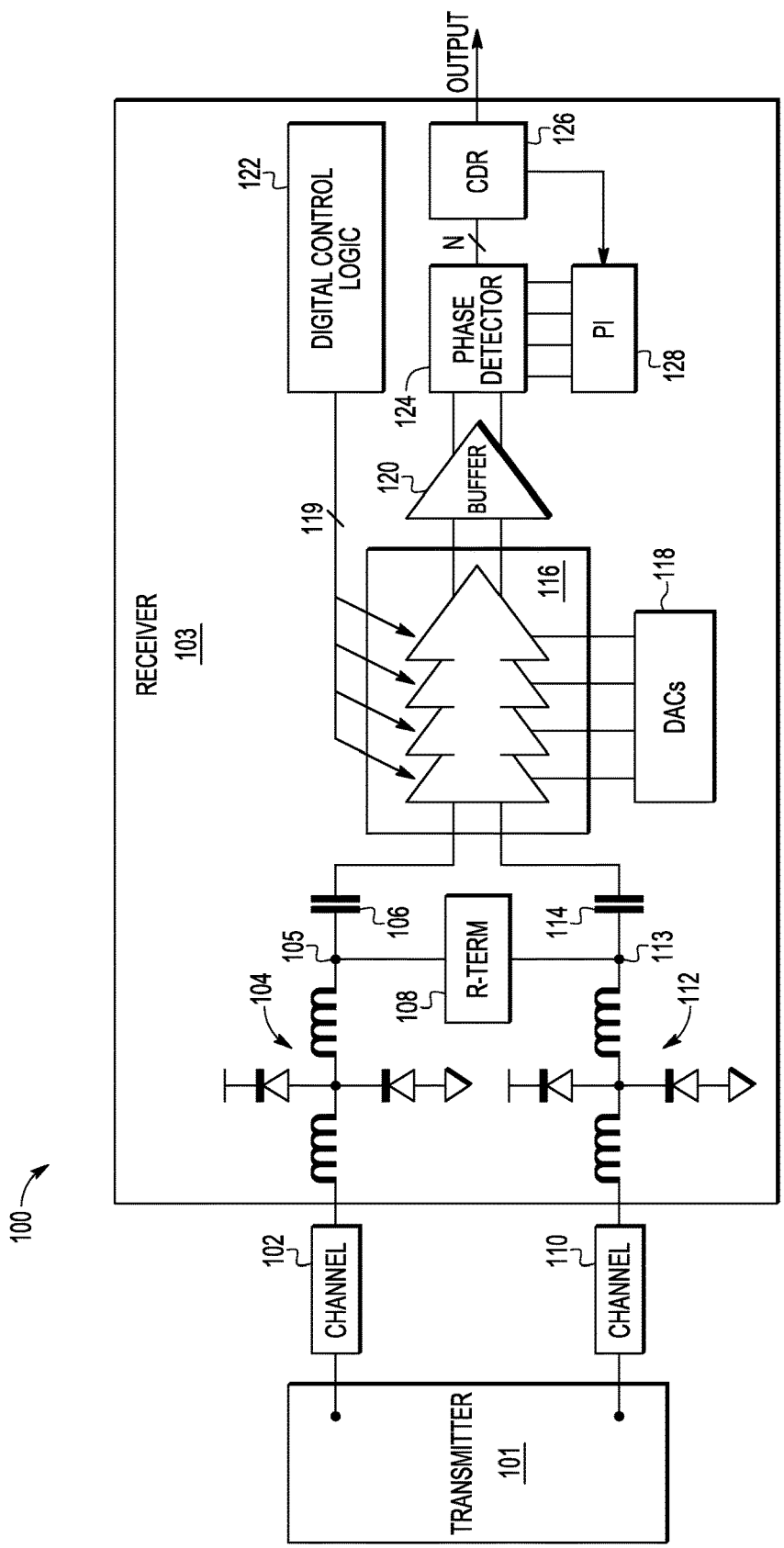
FIG. 1 illustrates, in block diagram form, an exemplary data communication system in accordance with an embodiment of the present disclosure.

FIG. 1 illustrates, in block diagram form, an exemplary data communication system 100 in accordance with an embodiment of the present disclosure. The data communication system 100 which may be used in high-speed serial communication systems, includes a transmitter (TX) 101, channels 102 and 110, and a receiver (RX) 103. The transmitter 101 may be located on a first integrated circuit (IC) and the receiver 103 may be located on a second IC. Channels 102 and 110 are coupled between the transmitter 101 and the receiver 103 and may be formed on a printed circuit board interconnecting the first IC and the second IC. The transmitter 101, transmits differential signals over channels 102 and 110. For example, transmitter 101 transmits a first signal over channel 102 and a second signal over channel 110, the second signal being a complementary signal of the first signal. After channels 102 and 110, the electrical signals go through Bridge-T networks 104 and 112, respectively, each network including two mutual inductors which are used for improved impedance matching and reduction of input return-loss. Also included with each Bridge-T networks 104 and 112 are diodes coupled for electrostatic discharge (ESD) protection. After the Bridge-T networks, the signals are transmitted through capacitors 106 and 114, which operate as alternating current (AC) coupling capacitors, to input nodes of linear equalizer stages 116. A resistive terminal network (R-Term) 108 is coupled between a circuit node 105, located between Bridge-T network 104 and capacitor 106, and a circuit node 113, located between Bridge-T network 112 and capacitor 114. R-Term 108 provides a self-calibrated input impedance. For example, it may provide a self-calibrated 100-Ohm differential input impedance.

Linear equalizer stages 116 includes any number of linear equalizers, including one or more active equalizers and a passive linear equalizer 200 or 300 (which will be described below in reference to FIGS. 2 and 3). The equalizer stages 116 receives equalizer controls 119 from digital control logic 122. The equalizer controls 119 operate on the active equalizer stages and also on the variable resistors and variable capacitors of the passive equalizers 200 and 300. The control of the active equalizer stages makes an adequate gain ratio of the high frequency gain to the low frequency gain in order to compensate the loss of the signal over different frequency regions. The control of passive equalizers 200 and 300 then manipulates the increment of the gain magnitude per unit frequency so that the overall linear equalization gain of linear equalizer stages 116 can be well matched to the desired gain characteristics. The equalizers are also coupled to offset voltage correcting digital-to-analog converters (DACs) 118. The offset voltage correcting DACs 118 provide two DC levels at the differential input ports of each equalizer stage so that the offset voltage present at the final equalizer output can be eliminated. The equalizers operate to counter the channel by attenuating the low frequency components and boosting the high frequency components. The linear equalizer chain of stages 116 therefore improves the signal quality and reduces the jitter of an eye diagram of the transmitted signal through the channels.

The output of linear equalizer stages 116 is provided to a buffer 120. The output of buffer 120 is provided to a phase detector 124 which determines phase differences between the output of buffer 120 and receiver sampling clocks given by phase interpolator (PI) 128. Phase detector 124 decodes the phase error and provides an N-bit data bus to clock and data recovery (CDR) circuit 126 which provides feedback to PI 128. PI 128 is coupled to phase detectors 124 and is used to generate signal phase shifts in discrete increment steps. PI 128 sends in-phase and quadrature clocks, which are 90 degrees out of phase, to sample the data signal at phase detector 124. When CDR 126 settles to a steady state, the in-phase PI clock will be lined up to the center of the data signal and the quadrature PI clock is present at the transition-edge of the data.

Figure 2:
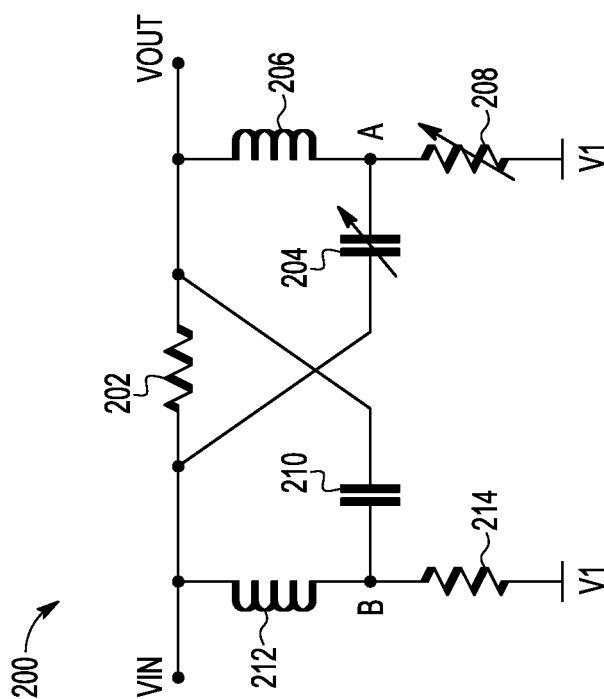
FIG. 2 illustrates, in schematic form, a passive equalizer in accordance with an embodiment of the present disclosure.

FIG. 2 illustrates a passive equalizer 200 in accordance with an embodiment of the present disclosure. Equalizer 200 includes resistors 202 and 214, inductors 206 and 212, capacitor 210, variable resistor 208, and variable capacitor 204. Resistors 202 and 214, and variable resistor may be referred to as resistive elements. Capacitor 210 and variable capacitor 204 may be referred to as capacitive elements. Inductors 206 and 212 may be referred to as inductive elements. Variable resistor 208 and variable capacitor 204 may be referred to as a tunable resistor and a tunable capacitor, respectively. A first terminal of resistor 202 is coupled to a circuit input node labeled VIN and a second terminal is coupled to a circuit output node labeled VOUT, which provides an output voltage. A first terminal of inductor 206 is coupled to output node VOUT and a second terminal of inductor 206 is coupled to a first terminal of variable resistor 208 at node labeled A. A second terminal of variable resistor 208 is coupled to a voltage supply node labeled V1. In this embodiment, V1 is at a voltage approximately equal to 0 volts or ground. A first terminal of variable capacitor 204 is coupled to input node VIN and a second terminal of variable capacitor 204 is coupled to node A. A first terminal of inductor 212 is coupled to input node VIN and a second terminal of inductor 212 is coupled to a first terminal of resistor 214 at node labeled B. A second terminal of resistor 214 is coupled to voltage supply node V1. A first terminal of capacitor 210 is coupled to output node VOUT and a second terminal of capacitor 210 is coupled to node B.

In operation, an input signal is received at input node VIN, and an equalized output signal is provided at output node VOUT. The output of equalizer 200 allows for a peaking gain at a desired frequency range. For example, to equalize the input signal, a peaking gain at high frequency range (GHI) equalization is provided by variable capacitor 204, inductor 206, and parasitic capacitance coupled at VOUT. A low frequency gain (GLO) in a forward path equalization is provided by a voltage divider including resistor 202 and variable resistor 208. Accordingly, an effective equalization gain of equalizer 200 which can be used to compensate for a distorted input signal may be approximated by GHI/GLO. In equalizer 200, the equalization gain may be adjusted by variable resistor 208, while the peaking gain GHI can remain constant.

A positive feedback path including capacitor 210 and inductor 212 provides minimized impedance along the positive feedback path at a resonant frequency of capacitor 210 and inductor 212. However, the impedance away from the resonant frequency increases rapidly. The transfer function of the positive feedback path at a desired frequency provides a maximum gain without attenuation, and gains for the frequencies below or beyond the resonant frequency may be reduced. The positive feedback path resonant frequency can be higher or lower relative to a forward path resonant frequency to affect overall transfer function characteristics. Therefore, an effective input signal amplitude may be further enhanced by the positive feedback path. The positive feedback path may further improve the equalization of equalizer 200 and shape the overall transfer function to include a smoother gain characteristic.

Figure 3:
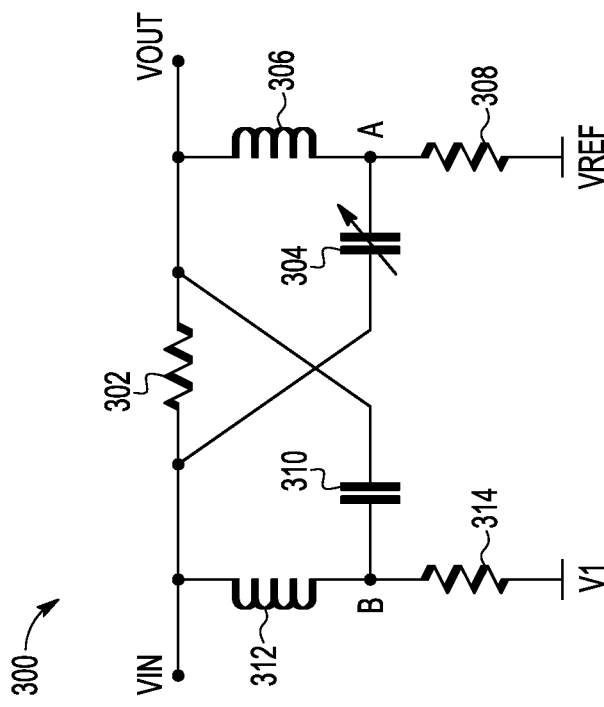
FIG. 3 illustrates, in schematic form, a passive equalizer in accordance with another embodiment of the present disclosure.

FIG. 3 illustrates a passive equalizer 300 in accordance with another embodiment of the present disclosure. Equalizer 300 includes resistors 302, 308, and 314, inductors 306 and 312, capacitor 310, and variable capacitor 304. Resistors 302, 308, and 314 may be referred to as resistive elements, capacitor 310 and variable capacitor 304 may be referred to as capacitive elements, and inductors 306 and 312 may be referred to as inductive elements. Variable capacitor 304 may also be referred to as a tunable capacitor. A first terminal of resistor 302 is coupled to a circuit input node labeled VIN and a second terminal is coupled to a circuit output node labeled VOUT, which provides an output voltage. A first terminal of inductor 306 is coupled to output node VOUT and a second terminal of inductor 306 is coupled to a first terminal of resistor 308 at node labeled A. A second terminal of resistor 308 is coupled to a first voltage supply node labeled VREF. In this embodiment, a reference voltage is supplied at voltage supply node VREF. The reference voltage may be supplied by a programmable voltage source to correct offsets. In some embodiments, VREF may be at a voltage approximately equal to 0 volts or ground. In some embodiments, the reference voltage VREF may be at a voltage higher than a ground voltage, or may be lower than the ground voltage. A first terminal of variable capacitor 304 is coupled to input node VIN and a second terminal of variable capacitor 304 is coupled to node A. A first terminal of inductor 312 is coupled to input node VIN and a second terminal of inductor 312 is coupled to a first terminal of resistor 314 at node labeled B. A second terminal of resistor 314 is coupled to a second voltage supply node V1. A first terminal of capacitor 310 is coupled to output node VOUT and a second terminal of capacitor 310 is coupled to node B.

In operation, an input signal is received at input node VIN, and an equalized output signal is provided at output node VOUT. The output of equalizer 300 allows for a peaking gain at a desired frequency range. For example, to equalize the input signal, a peaking gain at high frequency range (GHI) equalization is provided by variable capacitor 304, inductor 306, and parasitic capacitance coupled at VOUT. A low frequency gain (GLO) in a forward path equalization is provided by a voltage divider including resistors 302 and 208. Accordingly, an effective equalization gain of equalizer 300 which can be used to compensate for a distorted input signal may be approximated by GHI/GLO. In equalizer 300, the equalization gain may be adjusted by variable capacitor 304, while the low frequency gain GLO can remain constant. A programmable voltage may be supplied at voltage node VREF to correct offsets.

A positive feedback path including capacitor 310 and inductor 312 provides minimized impedance along the positive feedback path at a resonant frequency of capacitor 310 and inductor 312. However, the impedance away from the resonant frequency increases rapidly. The transfer function of the positive feedback path at a desired frequency provides a maximum gain without attenuation, and gains for the frequencies below or beyond the resonant frequency may be reduced. The positive feedback path resonant frequency can be higher or lower relative to a forward path resonant frequency to affect overall transfer function characteristics. Therefore, an effective input signal amplitude may be further enhanced by the positive feedback path. The positive feedback path may further improve the equalization of equalizer 300 and shape the overall transfer function to include a smoother gain characteristic.

Figure 4:
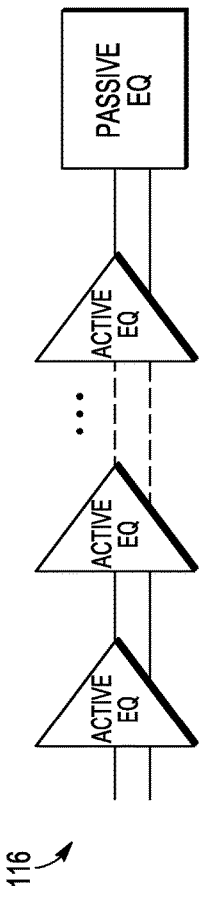
FIGS. 4-6 illustrate, in block diagram form, different configurations for a set of equalizers, in accordance with embodiments of the present disclosure.
Figure 5:
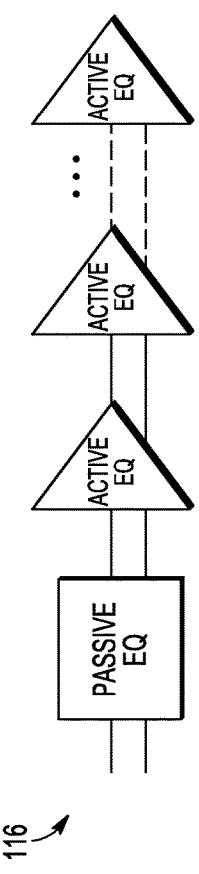
Figure 6:
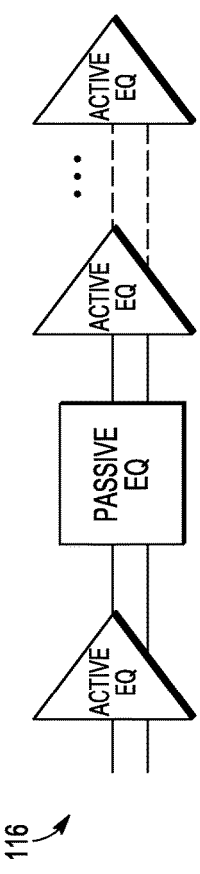

FIGS. 4-6 illustrate, in block diagram form, different configurations for linear equalizer stages 116 in FIG. 1, which utilize equalizers 200 and 300. In the embodiments of FIGS. 4-6, a differential signal is propagated through linear equalizer stages 116 including a passive equalizer stage. The passive equalizer stage labeled PASSIVE EQ in FIGS. 4-6 includes a pair of passive equalizers 200 (or 300), one for each channel of the differential signal. FIG. 4 illustrates a configuration in which linear equalizer stages 116 includes any number (one or more) active equalizer stages with a passive equalizer stage coupled at the end of the active equalizer stages. FIG. 5 illustrates a configuration in which a passive equalizer stage is located at the beginning of the one or more active equalizer stages. FIG. 6 illustrates a configuration in which a passive equalizer stage is located between active equalizer stages of the one or more active equalizer stages. Note that regardless of the placement of passive equalizer 200 (or 300), a higher gain is achieved at the desired frequency.

Generally, there is provided, a passive equalizer including a first resistive element coupled between an input node and an output node; a first inductive element and a second resistive element coupled in series between the output node and a first voltage supply node; and a first variable capacitor coupled between the input node and a first node located between the first inductive element and the second resistive element. A first terminal of the first inductive element may be coupled to the output node, a second terminal of the first inductive element may be coupled to a first terminal of the second resistive element, and a second terminal of the second resistive element may be coupled to the first voltage supply node. The first voltage supply node may supply a reference voltage. The second resistive element may be a variable resistor. The first voltage supply node may be characterized as ground. The passive equalizer may further include a second inductive element and a third resistive element coupled in series between the input node and a second voltage supply node; and a first capacitive element coupled between the output node and a second node located between the second inductive element and the third resistive element. A first terminal of the second inductive element may be coupled to the input node, a second terminal of the second inductive element may be coupled to a first terminal of the third resistive element, and a second terminal of the third resistive element may be coupled to the second voltage supply node. The first voltage supply node may supply a reference voltage and the second voltage supply node supplies a ground voltage. The first voltage supply node may supply a voltage that is higher than a voltage supplied at the second voltage supply node. The passive equalizer may further include an active equalizer, an input of the active equalizer coupled to the output node. The passive equalizer may further include an active equalizer stage, an output of the active equalizer coupled to the input node.

In another embodiment, there is provided, a passive equalizer including a first input node; a first output node; a first resistive element coupled between the first input node and the first output node; a first inductive element having a first terminal coupled to the first output node; a first variable capacitor having a first terminal coupled to the first input node and a second terminal coupled to a second terminal of the first inductive element; and a first variable resistor having a first terminal coupled to a second terminal of the first inductive element and to the second terminal of the first variable capacitor, and a second terminal coupled to a first voltage supply node. The passive equalizer may further include a second inductive element having a first terminal coupled to the first input node; a first capacitive element having a first terminal coupled to the first output node and a second terminal coupled to a second terminal of the second inductive element; and a second resistive element having a first terminal coupled to a second terminal of the second inductive element and to the second terminal of the first capacitive element, and a second terminal coupled to the first voltage supply node. The first voltage supply node may be characterized as a ground node. The passive equalizer may further include a third resistive element coupled between a second input node and a second output node; a third inductive element having a first terminal coupled to the second output node; a second variable capacitor having a first terminal coupled to the second input node and a second terminal coupled to a second terminal of the third inductive element; and a second variable resistor having a first terminal coupled to a second terminal of the third inductive element and to the second terminal of the second variable capacitor, and a second terminal coupled to the first voltage supply node; wherein the first input node receives a first signal and the second input node receives a second signal, the second signal being a complementary signal of the first signal. The passive equalizer may further include an active equalizer, wherein a first input of the active equalizer is coupled to the first output node and a second input of the active equalizer is coupled to the second output node. The passive equalizer may further include an active equalizer stage, wherein a first output of the active equalizer stage is coupled to the first input node and a second output of the active equalizer stage is coupled to the second input node.

In yet another embodiment, there is provided, a receiver, including an active equalizer; and a passive equalizer coupled to the active equalizer, the passive equalizer including a first resistive element coupled between an input node and an output node; a first inductive element having a first terminal coupled to the output node; a first variable capacitor having a first terminal coupled to the input node and a second terminal coupled to a second terminal of the first inductive element; and a second resistive element having a first terminal coupled to a second terminal of the first inductive element and to the second terminal of the first variable capacitor, and a second terminal coupled to a first voltage supply node. An output of the active equalizer may be coupled to the input node of the passive equalizer. The first output node of the passive equalizer may be coupled to an input of the active equalizer.

By now it should be appreciated that there has been provided, a passive EQ network for generating a gain magnitude greater than one at a high-frequency range and for enhancing the overall bandwidth for passive plus active equalizer stages. The passive EQ circuit uses a three-element resonant circuit with a serial LC and a shunt C to form a unilateral voltage transfer-function equalization gain greater than one and a resistive voltage-divider for a DC gain. A positive feedback scheme is formed when a second passive equalizer is combined back-to-back. The positive feedback scheme is useful with the active equalizers for both high-frequency and low-frequency gain equalization Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A passive equalizer comprising:
   a first resistive element coupled between an input node and an output node;
   a first inductive element and a second resistive element coupled in series between the output node and a first voltage supply node;
   a first variable capacitor coupled between the input node and a first node located between the first inductive element and the second resistive element;
   a second inductive element and a third resistive element coupled in series between the input node and a second voltage supply node, the first voltage supply node configured to supply a first voltage different from a second voltage supplied at the second voltage supply node; and
   a first capacitive element coupled between the output node and a second node located between the second inductive element and the third resistive element.

2. The passive equalizer of claim 1, wherein a first terminal of the second inductive element is coupled to the input node, a second terminal of the second inductive element is coupled to a first terminal of the third resistive element, and a second terminal of the third resistive element is coupled to the second voltage supply node.

3. The passive equalizer of claim 1, wherein the first voltage supply node supplies a reference voltage and the second voltage supply node supplies a ground voltage.

4. The passive equalizer of claim 1, further comprising:
   an active equalizer, an input of the active equalizer coupled to the output node.

5. The passive equalizer of claim 1, further comprising:
   an active equalizer stage, an output of the active equalizer coupled to the input node.

6. The passive equalizer of claim 1, wherein a first terminal of the first inductive element is coupled to the output node, a second terminal of the first inductive element is coupled to a first terminal of the second resistive element, and a second terminal of the second resistive element is coupled to the first voltage supply node.

7. The passive equalizer of claim 6, wherein the first voltage supply node supplies a reference voltage.

8. The passive equalizer of claim 6, wherein the second resistive element is a variable resistor.

9. The passive equalizer of claim 8, wherein the first voltage supply node is characterized as ground.

10. A passive equalizer comprising:
    a first input node;
    a first output node;
    a first resistive element coupled between the first input node and the first output node;
    a first inductive element having a first terminal coupled to the first output node;
    a first variable capacitor having a first terminal coupled to the first input node and a second terminal coupled to a second terminal of the first inductive element;
    a first variable resistor having a first terminal coupled to a second terminal of the first inductive element and to the second terminal of the first variable capacitor, and a second terminal coupled to a first voltage supply node
    a second resistive element coupled between a second input node and a second output node;
    a second inductive element having a first terminal coupled to the second output node;
    a second variable capacitor having a first terminal coupled to the second input node and a second terminal coupled to a second terminal of the second inductive element; and
    a second variable resistor having a first terminal coupled to a second terminal of the second inductive element and to the second terminal of the second variable capacitor, and a second terminal coupled to the first voltage supply node;
    wherein the first input node is configured to receive a first signal and the second input node is configured to receive a second signal, the second signal being a complementary signal of the first signal.

11. The passive equalizer of claim 10, further comprising:
an active equalizer, wherein a first input of the active equalizer is coupled to the first output node and a second input of the active equalizer is coupled to the second output node.

12. The passive equalizer of claim 10, further comprising:
an active equalizer stage, wherein a first output of the active equalizer stage is coupled to the first input node and a second output of the active equalizer stage is coupled to the second input node.

13. The passive equalizer of claim 10, further comprising:
a third inductive element having a first terminal coupled to the first input node;
a first capacitive element having a first terminal coupled to the first output node and a second terminal coupled to a second terminal of the third inductive element; and
a third resistive element having a first terminal coupled to a second terminal of the third inductive element and to the second terminal of the first capacitive element, and a second terminal coupled to the first voltage supply node.

14. The passive equalizer of claim 13, wherein the first voltage supply node is characterized as a ground node.

15. A receiver, comprising:
an active equalizer; and
a passive equalizer coupled to the active equalizer, the passive equalizer including:
  a first resistive element coupled between an input node and an output node;
  a first inductive element having a first terminal coupled to the output node;
  a first variable capacitor having a first terminal coupled to the input node and a second terminal coupled to a second terminal of the first inductive element;
  a second resistive element having a first terminal coupled to a second terminal of the first inductive element and to the second terminal of the first variable capacitor, and a second terminal coupled to a first voltage supply node, the first voltage supply node configured to supply a reference voltage;
  a second inductive element and a third resistive element coupled in series between the input node and a second voltage supply node, the second voltage supply node configured to supply a voltage different from the reference voltage; and
  a first capacitive element coupled between the output node and a second node located between the second inductive element and the third resistive element.

16. The receiver of claim 15, wherein an output of the active equalizer is coupled to the input node of the passive equalizer.

17. The receiver of claim 15, wherein the first output node of the passive equalizer is coupled to an input of the active equalizer.

18. The receiver of claim 15, wherein a first terminal of the first inductive element is coupled to the output node, a second terminal of the first inductive element is coupled to a first terminal of the second resistive element, and a second terminal of the second resistive element is coupled to the first voltage supply node.

19. The receiver of claim 15, wherein a first terminal of the second inductive element is coupled to the input node, a second terminal of the second inductive element is coupled to a first terminal of the third resistive element, and a second terminal of the third resistive element is coupled to the second voltage supply node.

20. The receiver of claim 15, further comprises:
a fourth resistive element coupled between a second input node and a second output node;
a third inductive element having a first terminal coupled to the second output node;
a second variable capacitor having a first terminal coupled to the second input node and a second terminal coupled to a second terminal of the third inductive element; and
a fifth resistive element having a first terminal coupled to a second terminal of the third inductive element and to the second terminal of the second variable capacitor, and a second terminal coupled to a third voltage supply node;
wherein the input node is configured to receive a first signal and the second input node is configured to receive a second signal, the second signal being a complementary signal of the first signal.

* * * * *